Aug. 17, 1937.  M. PRIBULA  2,090,551
SIPHON
Filed Aug. 26, 1936
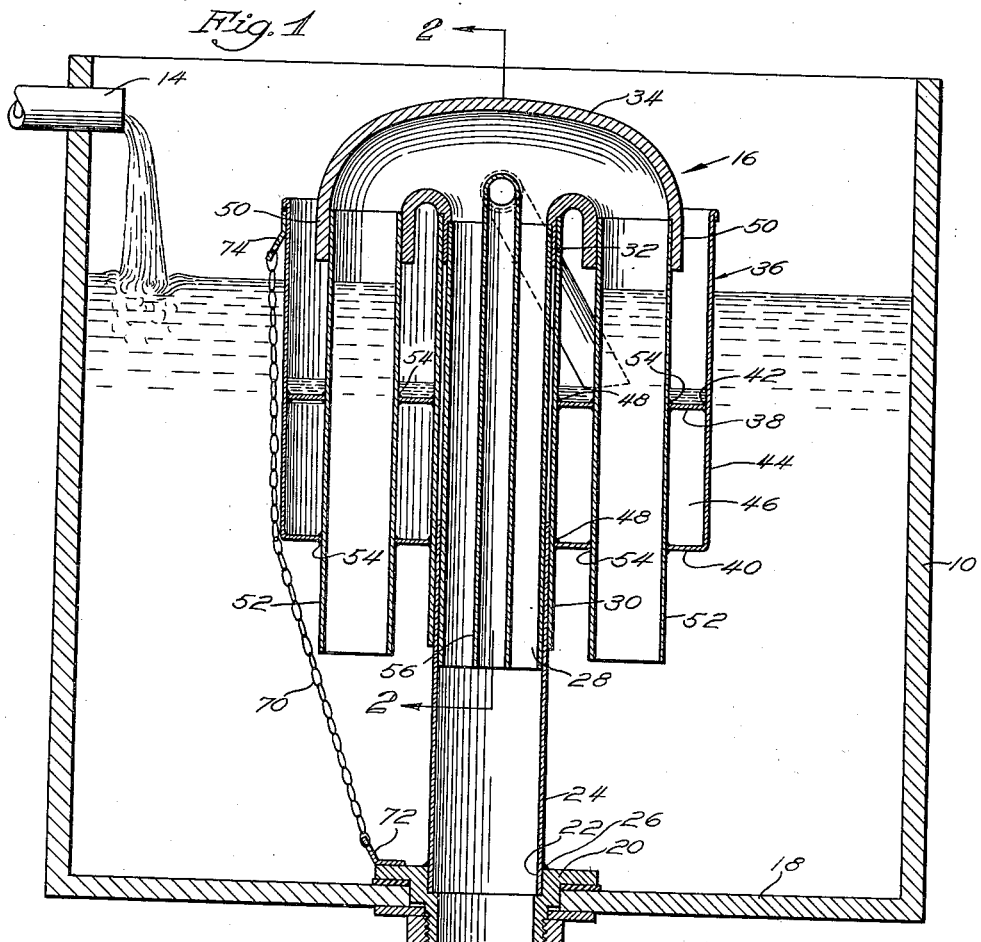
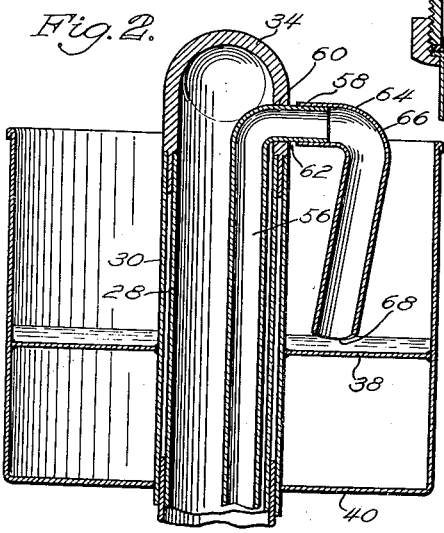
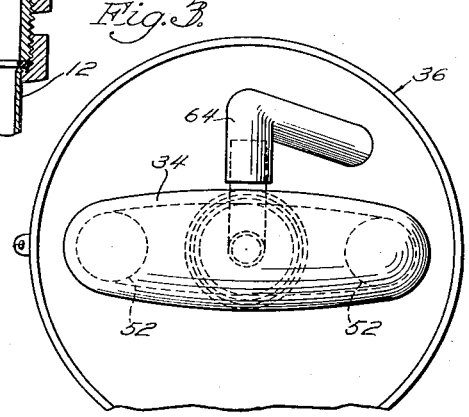
Mike Pribula
INVENTOR
BY Victor J. Evans & Co.
ATTORNEYS Patented Aug. 17, 1937

2,090,551

UNITED STATES PATENT OFFICE 2,090,551

SIPHON

Mike Pribula, Chicago, Ill.

Application August 26, 1936, Serial No. 98,019

3 Claims. (Cl. 137—106)

My invention relates to closets and urinals, and has among its objects and advantages the provision of an improved siphon flusher.

In the accompanying drawing:

Fig. 1 is a sectional view of my invention;

Fig. 2 is a sectional view along the line 2—2 of Fig. 1; and

Fig. 3 is a top plan view.

In the embodiment selected to illustrate my invention, I make use of a water tank 10 which includes a discharge pipe 12. Water is delivered to the tank continuously in regulated volume through the medium of a pipe 14. Within the tank 10 I mount a siphon 16 which operates to automatically siphon the water from the tank 10 at regular intervals and deliver the same to the discharge pipe 12.

In Fig. 1, the bottom 18 of the tank is provided with a coupling element 20 having an enlarged bore at 22 for the reception of a pipe 24 fixedly connected with the coupling element 20 by welding 26. My siphon 16 is movably mounted on the pipe 24 and comprises an inner tube 28 of such outside diameter as to move freely within the pipe 24. An outer tube 30 is associated with the inner tube 28 and is of such inside diameter as to move freely on the outer surface of the pipe 24. The upper ends of the tubes 28 and 30 are fixedly connected with a flange 32 having a head 34 which is of hollow construction and communicates with the inner tube 28.

To the tube 30 I fixedly connect a cup 36 which includes a partition 38 spaced from the bottom 40. The partition 38 is welded at 42 to the inner surface of the wall 44 to provide a liquid and airtight condition. The partition 38 is positioned at a considerable distance from the bottom 40 so that the chamber 46 constitutes a float.

The partition 38 and the bottom 40 are provided with aligned openings which closely embrace the outer surface of the tube 30, and the partition and the bottom are fixedly connected with the tube, as by welding 48. I provide the head 34 with two hollow necks 50 within each of which I fixedly secure a tube 52. These tubes extend through aligned openings in the partition 38 and the bottom 40 and are welded to these parts, as at 54. Both the tubes 52 extend downwardly below the bottom 40. A small tube 56 is positioned within the tube 28 and includes an end 58 projecting through an opening 60 in the head 34 and welded thereto at 62. Upon the end 58 I mount a tube 64 which is bent at 66 to position its opposite end 68 in close relation with the partition 38.

In operation, the siphon 16 floats on the water in the tank 10. Because of the loose relation between the tubes 28 and 30 and the pipe 24, the siphon rises easily on the pipe 24. As the water level rises in the tank 10, the siphon 16 will continue to rise until stopped by a chain 70 having one end fixedly connected with a lug 72 welded to the coupling element 20 and the opposite end connected with a lug 74 welded to the wall 44. Continued rising of the water in the tank 10 will cause the water to flow into the cup 36, and as the cup fills, the siphon will sink and the water in the tank will be siphoned therefrom through the tubes 52. The pipe 24 is of such length as to engage the flange 32 with the lower ends of the pipes 52 terminating in close relation with the bottom of the tank. As the water is being siphoned from the tank 10, the water in the cup 36 will be siphoned therefrom because of the tube 56. The lower end of the tube 64 terminates in close relation with the partition 38 so as to substantially drain the cup. After the water has been siphoned from the tank 10 and the cup 36 drained, the raising water level in the tank 10 will again lift the siphon to repeat the flushing action at regular intervals.

I have found that the float 46 operates to provide a positive and efficient lifting action for the siphon 16. The siphon is so constructed as to embody a high degree of compactness and may be used in tanks of various sizes. The siphon will operate in a tank of any desired water level by merely changing the length of the pipe 24 to accommodate the vertical travel of the siphon.

Without further elaboration, the foregoing will so fully explain my invention that others may, by applying current knowledge, readily adapt the same for use under various conditions of service.

I claim:

1. In a water tank having a discharge pipe, said discharge pipe extending above the bottom of the tank, a siphon movably mounted on the water discharge pipe, said siphon including a cup having a partition to define a sealed float, a siphon tube positioned inside the cup and passing through the float, and means connected with the siphon tube for delivering water to the discharge pipe when the siphon is submerged.

2. The combination of a discharge pipe, a hollow head, an outer tube and an inner tube connected with the head, said outer and inner tubes being spaced to have free telescopic relation with the discharge tube, a pair of siphon tubes communicating with said head, said head having communication with the discharge tube, an over-flow cup carried by said head, and a siphon tube for draining the cup, said cup including a partition defining a sealed float.

3. The combination of a discharge pipe, a hollow head, an outer tube and an inner tube connected with the head, said outer and inner tubes being spaced to have free telescopic relation with the discharge tube, a pair of siphon tubes communicating with said head, said head having communication with the discharge tube, an overflow cup carried by said head, a siphon tube for draining the cup, said cup including a partition defining a sealed float, and means for limiting the upward travel of the cup and the float.

MIKE PRIBULA.